US009509761B2

(12) United States Patent
Gonzalez, Jr. et al.

(10) Patent No.: US 9,509,761 B2
(45) Date of Patent: Nov. 29, 2016

(54) OPEN USER INTERFACE

(71) Applicants: Andres Gonzalez, Jr., Miami Lakes, FL (US); Ronald Victor Erickson, III, West Dundee, IL (US); Stefan Kendric Slade Tucker, Arlington Heights, IL (US)

(72) Inventors: Andres Gonzalez, Jr., Miami Lakes, FL (US); Ronald Victor Erickson, III, West Dundee, IL (US); Stefan Kendric Slade Tucker, Arlington Heights, IL (US)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 14/061,430

(22) Filed: Oct. 23, 2013

(65) Prior Publication Data
US 2015/0113042 A1 Apr. 23, 2015

(51) Int. Cl.
*H04L 29/08* (2006.01)
*H04M 1/725* (2006.01)
*G06F 9/44* (2006.01)
*G06F 17/30* (2006.01)
*H04W 4/00* (2009.01)

(52) U.S. Cl.
CPC ............. *H04L 67/10* (2013.01); *G06F 8/20* (2013.01); *G06F 8/38* (2013.01); *G06F 9/443* (2013.01); *G06F 17/30* (2013.01); *H04M 1/72525* (2013.01); *H04W 4/003* (2013.01)

(58) Field of Classification Search
CPC ......... H04L 67/10; G06F 17/30; G06F 8/20; G06F 8/38
USPC ....................................................... 709/224
See application file for complete search history.

(56) References Cited

U.S. PATENT DOCUMENTS

| | | | |
|---|---|---|---|
| 7,600,219 B2 | 10/2009 | Tsantilis | |
| 7,720,931 B2 | 5/2010 | Mei et al. | |
| 7,739,678 B2 | 6/2010 | Damodhar | |
| 8,209,675 B2 | 6/2012 | Zhao et al. | |
| 8,645,905 B2 | 2/2014 | Halbedel | |
| 8,656,343 B2 | 2/2014 | Fox et al. | |
| 8,726,264 B1 | 5/2014 | Allen et al. | |
| 8,819,650 B2 | 8/2014 | Barcia et al. | |
| 8,825,689 B2 | 9/2014 | Fedorenko et al. | |
| 8,839,222 B1 | 9/2014 | Brandwine et al. | |
| 2002/0199031 A1* | 12/2002 | Rust .......................... | G06F 8/24 719/315 |
| 2004/0015953 A1 | 1/2004 | Vincent | |
| 2005/0246656 A1* | 11/2005 | Vasilev ..................... | G06F 8/20 715/805 |
| 2005/0278708 A1* | 12/2005 | Zhao ........................ | G06F 8/20 717/136 |
| 2006/0101396 A1* | 5/2006 | Burke ....................... | G06F 8/71 717/120 |

(Continued)

*Primary Examiner* — Nicholas Taylor
*Assistant Examiner* — Chong G Kim
(74) *Attorney, Agent, or Firm* — Schwegman Lundberg & Woessner, P.A.

(57) ABSTRACT

In an example embodiment, a definition is loaded into a client application for execution on a user device. Then, one or more classes defined in a central repository database of a server are loaded into the client application. It may then be determined that one or more custom classes not defined in the central repository database are contained in the definition. The one or more custom classes may be validated by ensuring that they contain one or more preset functions. The one or more custom classes may then be loaded into the client application, thereby overriding or extending at least one of the one or more classes defined in the central repository database.

13 Claims, 8 Drawing Sheets

(56) References Cited

U.S. PATENT DOCUMENTS

| | | | |
|---|---|---|---|
| 2006/0248467 A1* | 11/2006 | Elvanoglu | G06F 9/4435 715/744 |
| 2008/0059940 A1* | 3/2008 | Matic | G06F 8/00 717/100 |
| 2008/0229300 A1 | 9/2008 | O'Brien | |
| 2008/0270998 A1* | 10/2008 | Zambrana | G06F 11/3612 717/131 |
| 2009/0013310 A1 | 1/2009 | Arner et al. | |
| 2009/0328067 A1* | 12/2009 | Srinivasan | G06F 8/30 719/316 |
| 2010/0017503 A1 | 1/2010 | Kim et al. | |
| 2010/0017812 A1* | 1/2010 | Nigam | G06F 8/20 719/328 |
| 2010/0174974 A1* | 7/2010 | Brisebois | G06F 17/243 715/223 |
| 2010/0333072 A1* | 12/2010 | Dulip | G06F 11/3419 717/128 |
| 2011/0154287 A1* | 6/2011 | Mukkamala | G06F 8/20 717/105 |
| 2011/0225485 A1* | 9/2011 | Schnitt | G06F 17/243 715/222 |
| 2011/0252234 A1* | 10/2011 | De Atley | H04L 9/0891 713/165 |
| 2011/0252236 A1* | 10/2011 | De Atley | G06F 11/1464 713/168 |
| 2011/0252243 A1* | 10/2011 | Brouwer | H04L 9/0838 713/189 |
| 2012/0054262 A1* | 3/2012 | Demant | G06F 9/54 709/203 |
| 2012/0060148 A1 | 3/2012 | Jones et al. | |
| 2012/0198365 A1* | 8/2012 | Bornheimer | G06F 8/77 715/762 |
| 2012/0266159 A1* | 10/2012 | Risbood | G06F 8/61 717/177 |
| 2013/0117731 A1* | 5/2013 | LeSuer | G06F 11/3668 717/125 |
| 2013/0262626 A1* | 10/2013 | Bozek | H04L 67/10 709/217 |
| 2013/0275848 A1* | 10/2013 | Neagu | G06F 8/70 715/223 |
| 2013/0298185 A1* | 11/2013 | Koneru | G06F 15/173 726/1 |
| 2014/0040979 A1* | 2/2014 | Barton | H04L 63/20 726/1 |
| 2014/0364099 A1* | 12/2014 | Pai | H04L 63/08 455/418 |

* cited by examiner

OPEN USER INTERFACE

TECHNICAL FIELD

This document generally relates to methods and systems for use with computer networks. More particularly, this document relates to an open user interface.

BACKGROUND

Mobile applications (also known as "apps") have dramatically increased in popularity with the rise of smartphones and tablets. It is common for these applications to be downloaded by end users from a central repository, sometimes referred to as an "app store," or other location where digital files can be downloaded to user devices. Software developers often create apps and upload these apps to the app store. There are tools that aid software developers in designing, deploying, and managing the entire lifecycle of mobile apps.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
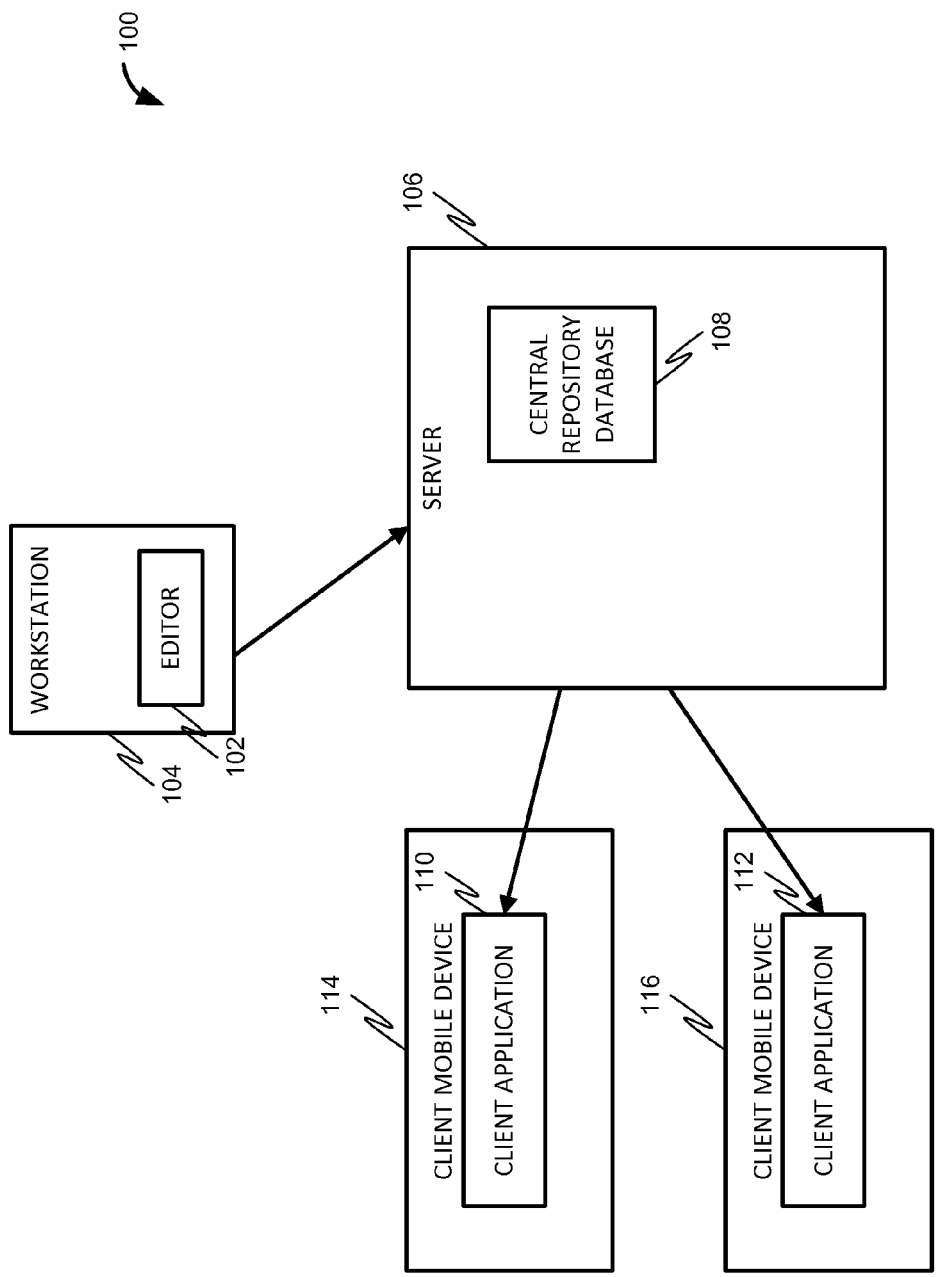
FIG. 1 is a diagram illustrating a system, in accordance with an example embodiment, implementing a tool to aid in designing, deploying, and managing the application.

In an example embodiment, a tool may be provided to an application developer to aid in designing, deploying, and managing the application. FIG. 1 is a diagram illustrating a system 100, in accordance with an example embodiment, implementing such a tool. The system may include an editor 102, which may be a software program installed by a designer on a device (such as a workstation 104). The editor 102 may utilize an object model to create a central definition and repository of functions (e.g., business logic and business rules) as needed for an application. The editor 102 may also provide the ability to access, reuse, and edit this library of application building blocks.

A server 106 may maintain a database of all communications, synchronization, security, error handling, personalization, and transactional controls needed to successfully deploy, manage, and support mobile applications designed in the editor 102. Solution definitions created in the editor may be versioned and stored in a central repository database 108. The server 106 then interacts with client applications 110, 112 installed on client devices 114, 116 and works on their behalf to pull information and post transactions to one or more enterprise systems (not pictured). Each client application 110, 112 can communicate in a variety of modes, such as online, offline, and occasionally connected modes. In an example embodiment, one or more of the client applications 110, 112 can be deployed in a thin-client format, serving as a real-time wireless browser. The client applications 110, 112 can interpret the editor definitions to create and control the user experience and enforce all business rules and workflow. The definitions typically will define a user interface for the client applications 110, 112, but will often utilize standardized controls, usually in the form of the various functions in the repository of functions and often stored in the central repository database 108.

In an example embodiment, a mechanism is provided allowing a designer to provide custom controls, and thus a custom user interface, in a manner that standard controls are, at runtime, not utilized in favor of the custom controls.

For example, a designer may wish to design a custom thermometer control, which includes a user interface for viewing and interacting with a visual thermometer, but such a control may not be defined in the repository of functions in the central repository database 108.

In an example embodiment, the client applications 110, 112 are designed to, at runtime, look for custom controls defined by the designer, and if such custom controls exist, load and run them in the client applications 110, 112.

In an example embodiment, the designer creates a custom control by adding a new class in the editor 102. Each client application 110, 112 is then designed to, at runtime, determine that the new class exists and load that new class in addition to, or in lieu of, some or all of the classes defined in the central repository database 108.

Notably, the custom controls are then available to each client application 110, 112 before the client application 110, 112 even connects to an enterprise server.

In an example embodiment, each client application 110, 112 may be designed to verify that the custom controls conform to a set of standards. If a custom control does not conform, it will then not be loaded and run. Such standards may include the use of a specific set of functions. These functions may be ones that define how data is input and output, as well as ones that specify how the control is displayed (e.g., autosize behavior, presence of a label, etc.).

In addition to custom controls, in an example embodiment, the designer may also personalize the client application(s) to include their own art, such as logos, splash screens, and the like.

As described briefly above, the editor 102 may provide several features for creating, managing, and publishing an application project. Project management features may include the ability to export definitions from the project to a single file, as well as support for multiple developers for a common repository. Exports can be performed for the entire project, manually selected definitions within the project, or automatically selected definitions based on differences between two different versions of the same project. Additional features may include the ability to compare two projects or a project and export file and to selectively import components from a source to the current project.

Publishing is the task performed when modifications within the application project are in a stable state and can be either tested or deployed to end users. The process of publishing can include development publishes, production publishes to a single server instance, or production publishes to a cluster of servers. The process of publishing to production for deployment can be performed directly to the server, or alternatively may involve an intermediary production server. The implementation may depend on the network environment and policies in the implementation environment.

The developer may use the editor 102 to create one or more system connections, which connect the client application 110, 112 to some back-end system with which the client application 110, 112 will synchronize. The developer may then add modules to the application project. Once this is complete, a client application project has been created and development work can begin. The developer may configure the project with respect to file associations and file encoding, and create the various definitions for the client application 110, 112.

In an example embodiment, an Open User Interface (Open UI) framework is provided to enable application designers to further customize their applications by defining the views to be displayed for each field in an editor screen programmatically using the platform's natural language. Thus, for example, if the platform is iOS, then the language may be Objective-C. For the Android platform, the language may be Java. For WPF/.NET, any language that runs on the common language runtime (CLR) may be used, such as C#, C++/CX, and VB.NET.

The Open UI framework allows an arbitrary platform class to become an extension to an editor screen field. Such a class is then used to implement an Open UI Field Adapter interface. By doing so, the system will be able to notify the class when the data it is displaying has been modified or some of the display attributes have changed, request desired behavior from the class such as whether the label should be displayed for the field by the system, and request from the class the view to display in the screen. It should be noted that interfaces are not required to be used. In some example embodiments, abstract classes can be provided to provide this functionality. With the abstract classes, it can be enforced that some methods are implemented and default implementations can be given for others. It should be noted that this may be different for the WPF/.NET platform, where events may be used to notify the control rather than direct callbacks.

In order to enable this behavior, the designer may need to provide the name of the adapter class for the field in the editor. In an example embodiment, this may be performed via a "field extension" tab in the editor for each field type that supports Open UI extensions. This will be described in more detail below.

The field extension adapters may be provided at initialization time with an object implementing an Open UI Field Model protocol. By using this object, the adapter object is able to request the system for the data the adapter needs to represent, as well as other attributes.

In an example embodiment, when a screen is being constructed by a client application 110, 112, it will check to see if a field has been extended. If so, it will then check to see if the provided extension class implements the correct adapter protocol for the field type. If so, it will then instantiate the adapter class and provide it with a model. After this, a user interface view will be requested from the adapter to be displayed in a detail screen.

Figure 2:
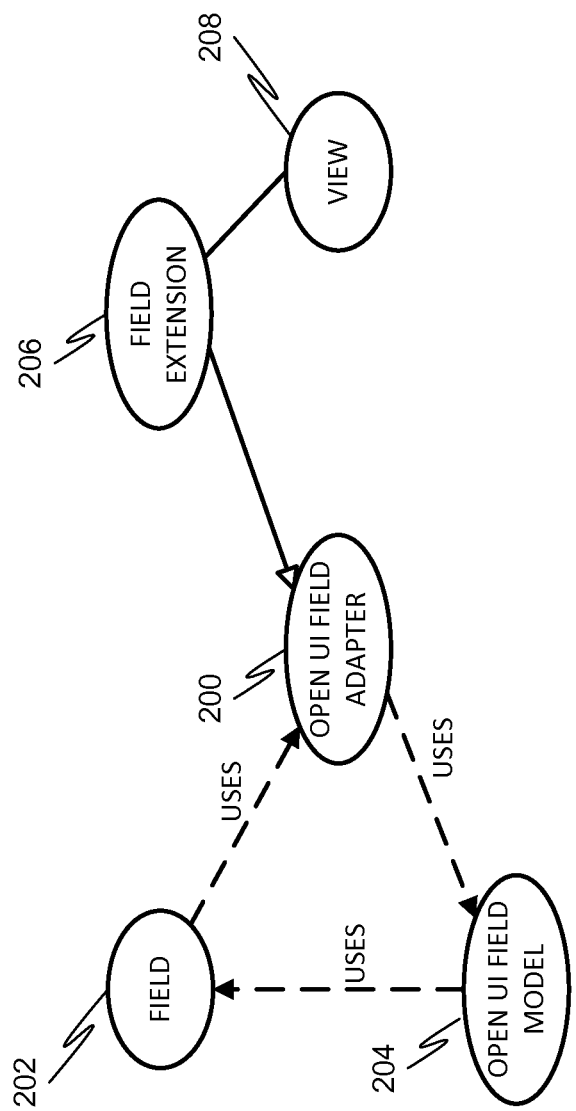
FIG. 2 is a class diagram illustrating how models and adapters work together, in accordance with an example embodiment.

FIG. 2 is a class diagram illustrating how models and adapters work together, in accordance with an example embodiment. The Open UI Field Adapter object 200 uses the Field object 202, which uses the Open UI Field Model object 204, which itself uses the Open UI Field Adapter object 200. The Open UI Field Adapter object 200 also accesses a field extension object 206, which may define a view 208.

In an example embodiment, as part of the Open UI framework, the client application may have been converted into a pseudo framework containing a statically linked library that application designers can use to create a project and to build their custom field adapters. Because many platforms do not support the proper creation of a dynamic framework, the library in the Open UI framework may be one that is supposed to be statically linked into the application. This library and the resources provided within the framework contain all the functionality of the client application.

With branding, an application designer can personalize the client application to include their art as well as strings and have the client application use these resources even before connecting to a server. In an example embodiment, there may be three types of resources that can be branded: platform resources, client application resources, and strings.

Art or other graphics may be one of many different types of graphic elements that can be personalized using this process. Other example graphic elements include, but are not limited to, logos, marks, emblems, figures, symbols, text, entry object, etc.

Platform resources are resources that the operating system uses on behalf of the application screen before it launches, such as an icon and name to use on the springboard or home screen, the default launch images to use while the application is being loaded for the first time, and so forth. In an example embodiment, such as one utilizing the iOS operating system, to brand or change these resources, the application designer can modify a plist file in the framework to add desired images to the application main number with the expected names (e.g., default.png, icon.png, etc.).

Client application resources are the resources that the client application uses by default before it has connected to the server. These include items such as the login dialog image or the about dialog image. To brand or change these resources, the application designer can add a file of the same name to the main bundle of their applications. The client application will give preference to using these resource files when present over the ones in the bundle.

Strings are localized strings used throughout the client application user interface. These can be overridden by a server mechanism, but also could be branded to customize the client application even before the initial transmission. To brand or change these resources, the application designer may add a file that contains all necessary strings in a dictionary to the main bundle of their application. The format of the fields of the file may be, for example [key: String_N value: the new value] where N is the number of the resource. For example:

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0">
<dict>
<key>String_6155</key>
<string>Fun with Branded Apps</string>
</dict>
</plist>
``` will change string 6155, which is the login dialog caption, from a default string (e.g., "Welcome to the Client Application") to "Fun with Branded Apps."

Additionally, in an example embodiment, there may be additional special strings that can be added to the file, such as serverURL, which provides a default uniform resource locator (URL) for a server that will prevent a user from being able to select their server URL.

Figure 3:
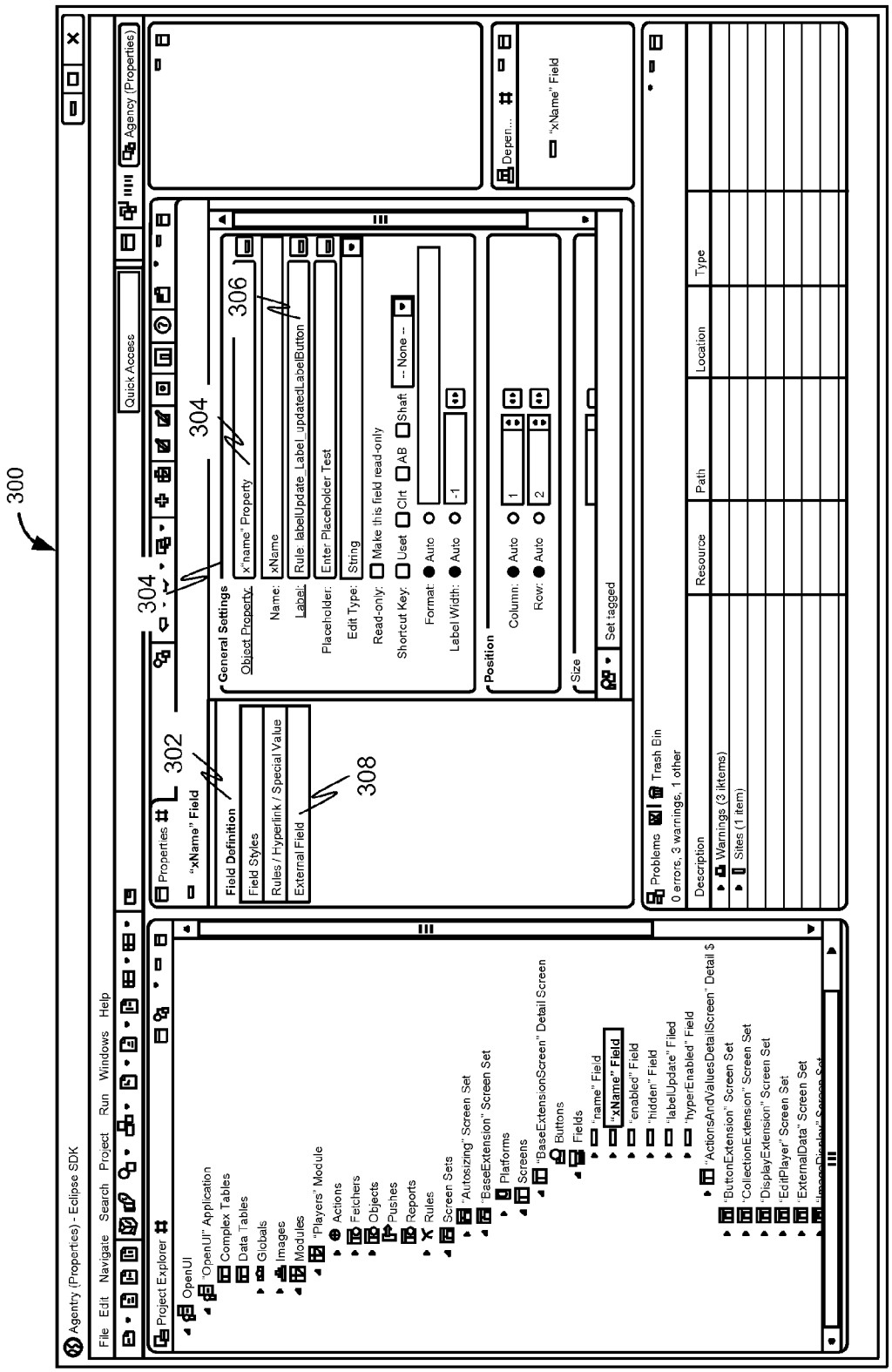
FIG. 3 is a screen capture illustrating a screen of an editor, in accordance with an example embodiment.

In an example embodiment, in order to add a field extension, the application designer navigates the editor to a screen set that contains a detail screen that includes a string display field. The application designer then double clicks on the field to access the field definition. FIG. 3 is a screen capture illustrating a screen of an editor 300, in accordance with an example embodiment. Here, the field definition tab 302 has been selected, revealing various details about the field. Next, the application designer may verify that the field is targeted to an object property 304 and that the edit type 306 of the field is set to String. Next, the application designer may navigate to an external field tab 308.

Figure 4:
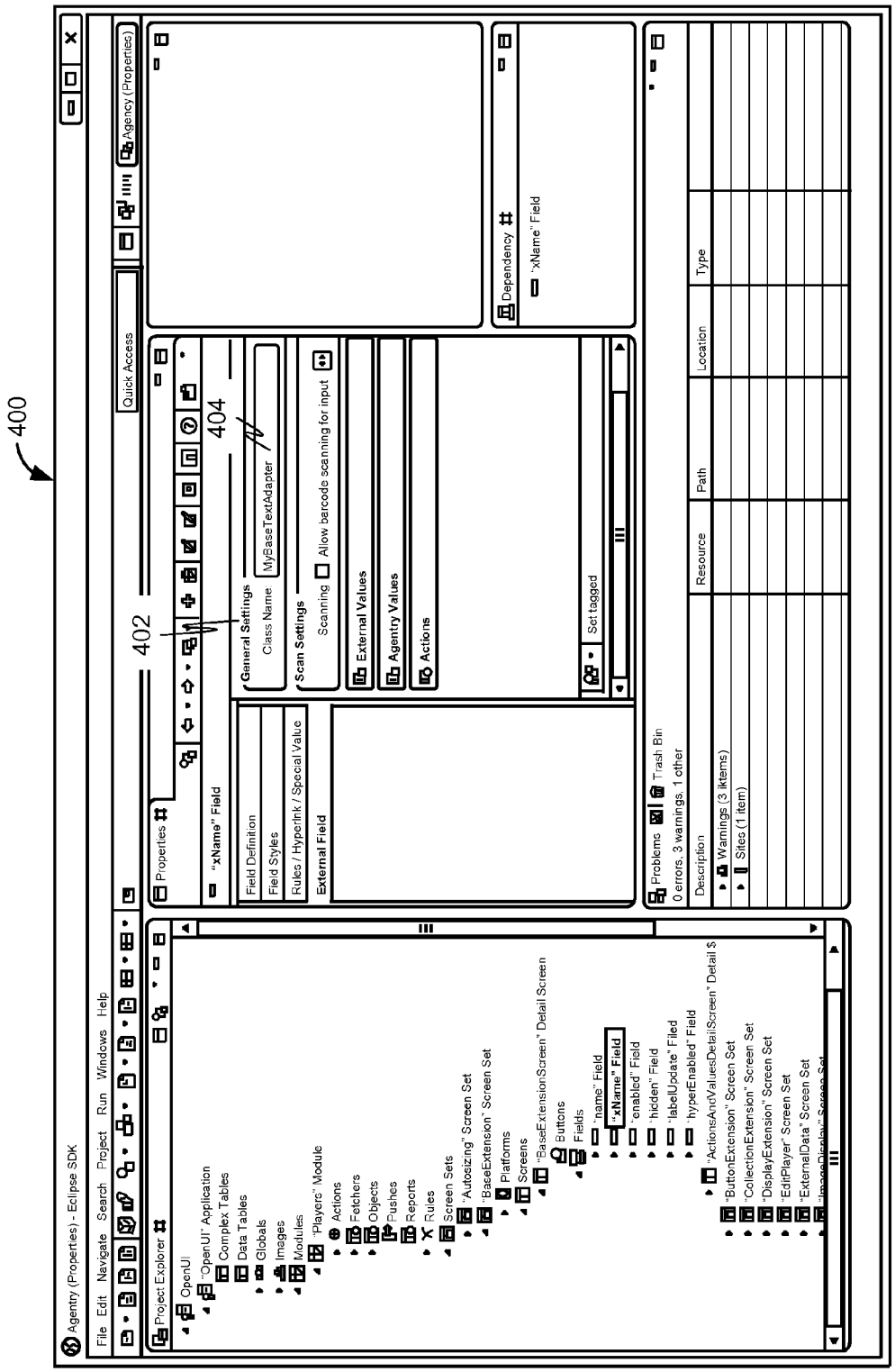
FIG. 4 is a screen capture illustrating another screen of the editor, in accordance with an example embodiment.

FIG. 4 is a screen capture illustrating another screen of the editor 400, in accordance with an example embodiment. Here, various details 402 about the external field are displayed. The user may enter a name, such as "MyBaseTestAdapter" in the client name field 404. The application developer may then save the changes and publish the modified application to a server.

The application designer may then create an adapter extension class in an integrated development environment, such as Xcode. This may be accomplished by, for example, opening a project, building it, and launching it. A new class file can then be created and given a name, such as MyShadowsStringDisplayAdapter. This will generate files for the class, such as .h and .m files. In the .h file, the application designer can import the header file for the Open UI framework, and ensure that the new class implements the OpenUIStringDisplayAdapter protocol. Thus, the code in the .h file may look like the following:

```
#import <Foundation/Foundation.h>
#import <OpenUI/OpenUI.h>
@interface MyShadowStringDisplayAdapter :
    NSObject<OpenUIStringDisplayAdapter>
@end
```

In the .m file, the application designer may implement the OpenUIStringDisplayAdapter protocol methods. First, the model that the system will pass at construction time needs to be implemented. The model may be saved in a private property of the implementation class. The code in the .m file may look like the following:

```
#import "MyShadowStringDisplayAdapter.h"
#import <UIKit/UIKit.h>
@interface MyShadowStringDisplayAdapter ( )
@property (nonatomic, assign) id<OpenUIStringDisplayModel> model;
@end
@implementation MyShadowStringDisplayAdapter
-
    (id<OpenUIStringDisplayAdapter>)initWithStringDisplayModel:(id<O
    penUIStringDisplayModel>)model
{
if (self = [super init])
    {
    self.model = model;
    }
    return self;
}
@end.
```

Second, the application developer may implement the method that the system will call when requesting the view to display for this field. For a view, a ULabel with a shadow may be used. In this case, the view does not need to be retrained because the system will do so for as long as the screen where the field is displayed exists. The code in the .m file may look like the following:

```
#import "MyShadowStringDisplayAdapter.h"
#import <UIKit/UIKit.h>
@interface MyShadowStringDisplayAdapter ( )
@property (nonatomic, assign) id<OpenUIStringDisplayModel> model;
@property (nonatomic, retain) UILabel* label;
@end
```

```
@implementation MyShadowStringDisplayAdapter
-
    (id<OpenUIStringDisplayAdapter>)initWithStringDisplayModel:(id<O
    penUIStringDisplayModel>)model
{
    if (self = [super init])
    {
        self.model = model;
    }
    return self;
}
- (void)dealloc
{
    self.label = nil;
    [super dealloc];
}
- (UIView *)viewForFrame:(CGRect)frame
{
    self.label = [[[UILabel alloc] initWithFrame:frame] autorelease];
    // So the label always takes up all of the space of the field
    self.label.autoresizingMask = UIViewAutoresizingFlexibleHeight |
    UIViewAutoresizingFlexibleWidth;
    self.label.shadowColor = [UIColor grayColor];
    self.label.shadowOffset = CGSizeMake(-2.0f , -2.0f);
    // Set the text as it is now
    self.label.text = self.model.value;
    return self.label;
}
@end
```

Third, the method that the system will use to notify of changes to the text displayed in the label may be implemented. This may be used if, for example, the field is retargeted to a different object or if an update rule is run that produces a different text. The code in the .m may look like the following:

```
#import "MyShadowStringDisplayAdapter.h"
#import <UIKit/UIKit.h>
@interface MyShadowStringDisplayAdapter ( )
@property (nonatomic, assign) id<OpenUIStringDisplayModel> model;
@property (nonatomic, retain) UILabel* label;
@end
@implementation MyShadowStringDisplayAdapter
-
(id<OpenUIStringDisplayAdapter>)initWithStringDisplayModel:(id<OpenUIStr
ingDisplayModel>)model
{
    if (self = [super init])
    {
        self.model = model;
    }
    return self;
}
- (void)dealloc
{
    self.label = nil;
    [super dealloc];
}
- (UIView *)viewForFrame:(CGRect)frame
{
    self.label = [[[UILabel alloc] initWithFrame:frame] autorelease];
    // So the label always takes up all of the space of the field
    self.label.autoresizingMask = UIViewAutoresizingFlexibleHeight |
    UIViewAutoresizingFlexibleWidth;
    // This is what makes this string display field special ...
    self.label.shadowColor = [UIColor grayColor];
    self.label.shadowOffset = CGSizeMake(-2.0f , -2.0f);
    // Set the text as it is now
    self.label.text = self.model.value;
    return self.label;
}
- (void)model:(id<OpenUIStringDisplayModel>)model
didChangeString:(NSString *)value
```

```
{
    // System has modified the text. Make sure we are up to date in the UI as
well.
    self.label.text = value;
}
@end
```

In another example embodiment, class files may be placed in a specific package for one platform and use similar conventions for additional platforms. This allows one field definition in the editor to be used across multiple platforms. For example, a developer could name a class "MyTest-Adapter". As long as each of three clients had an implementation of "MyTestAdapter" in the correct package or namespace, they would be able to display it.

Figure 5:
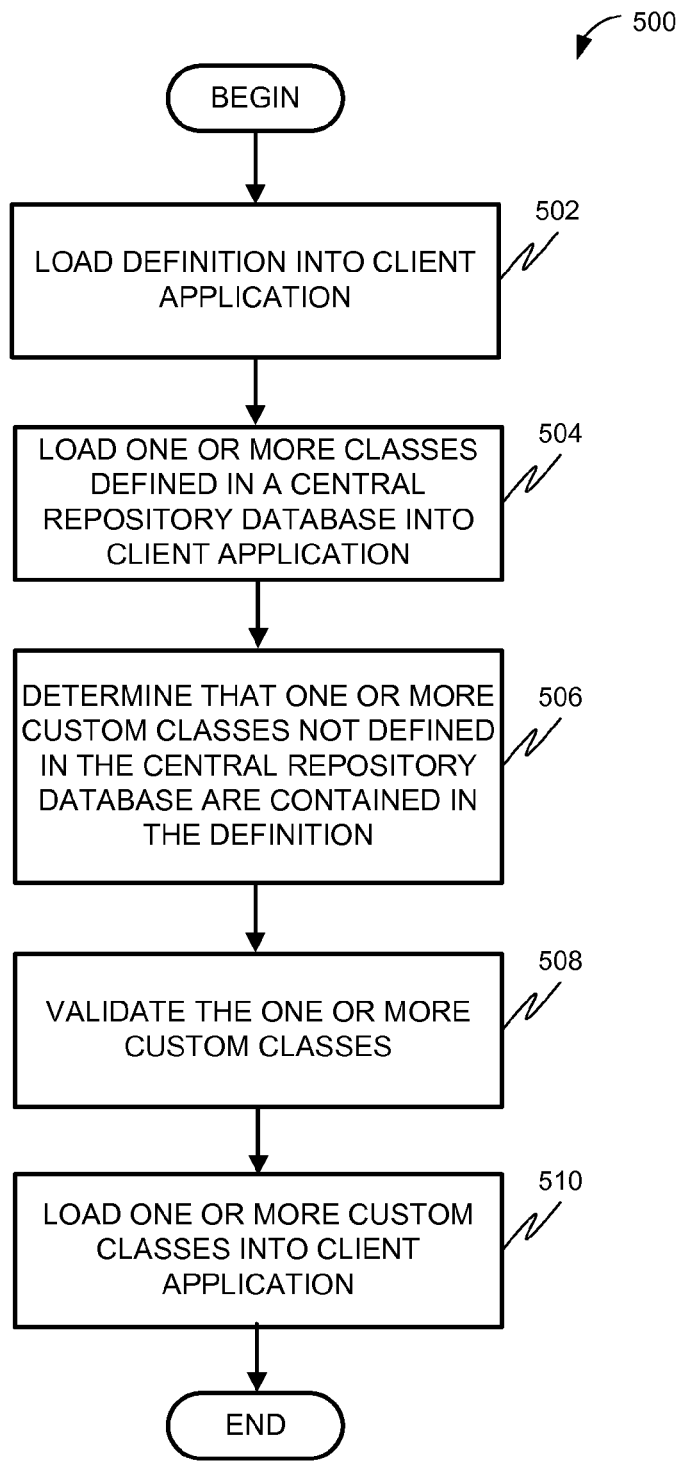
FIG. 5 is a flow diagram illustrating a method, in accordance with an example embodiment, of operating a user device.

FIG. 5 is a flow diagram illustrating a method 500, in accordance with an example embodiment, of operating a user device. At operation 502, a definition is loaded into a client application for execution on the user device. At operation 504, one or more classes defined in a central repository database of a server are loaded into the client application. At operation 506, it may be determined that one or more custom classes not defined in the central repository database are contained in the definition. At operation 508, the one or more custom classes may be validated by ensuring that they contain one or more preset functions. At operation 510, the one or more custom classes may be loaded into the client application, thereby overriding or extending at least one of the one or more classes defined in the central repository database.

Figure 6:
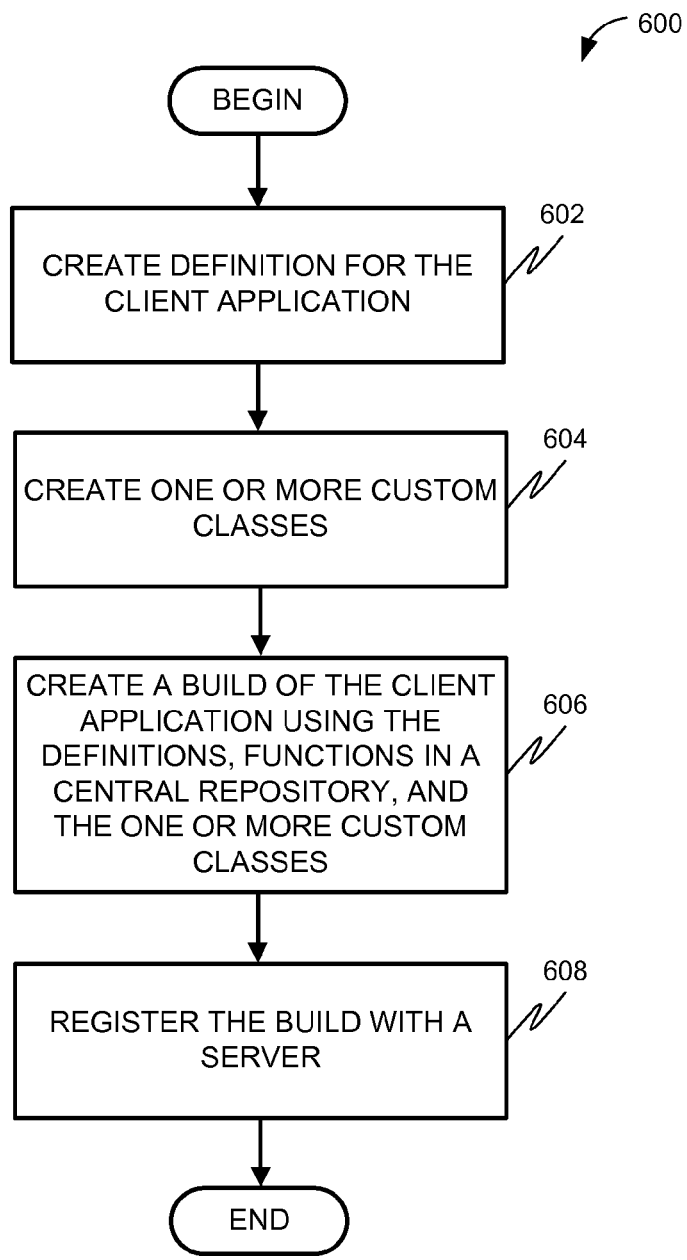
FIG. 6 is a flow diagram illustrating a method, in accordance with an example embodiment, of providing a custom class by an application designer in a system having a server with a central repository of functions defining a portion of a client application for operation on one or more client devices.

FIG. 6 is a flow diagram illustrating a method 600, in accordance with an example embodiment, of providing a custom class by an application designer in a system having a server with a central repository of functions defining a portion of a client application for operation on one or more client devices. At operation 602, a definition is created for the client application in an editor, with the definition defining user experience for the client application. At operation 604, one or more custom classes are created for the client application in the editor, and the one or more custom classes are not defined in the central repository database. At operation 606, a build of the client application is created using the definition, one or more functions in the central repository of functions, and the one or more custom classes. At operation 608, the build of the client application is registered with the server for download by the one or more client devices.

Example Mobile Device

Figure 7:
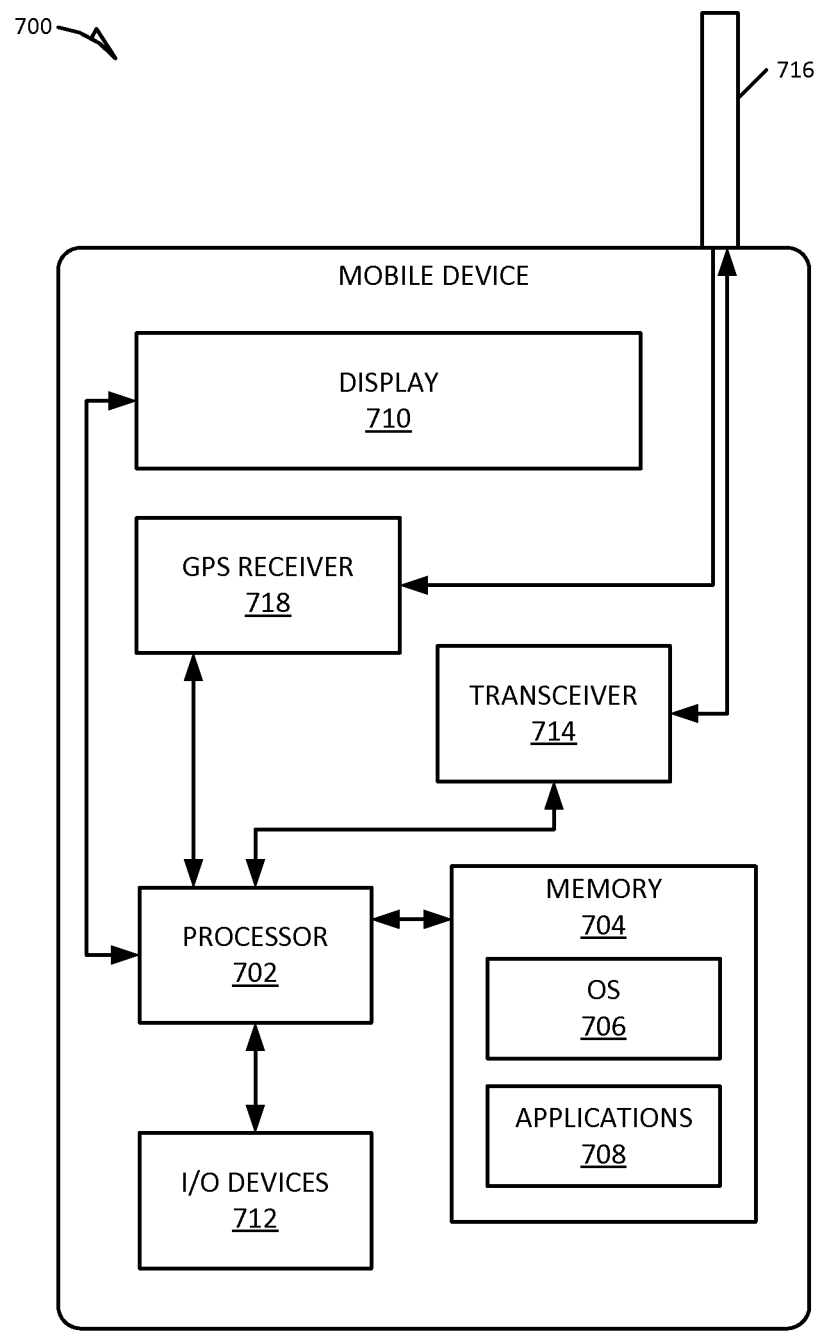
FIG. 7 is a block diagram illustrating a mobile device, according to an example embodiment.

FIG. 7 is a block diagram illustrating a mobile device 700, according to an example embodiment. The mobile device 700 may include a processor 702. The processor 702 may be any of a variety of different types of commercially available processors suitable for mobile devices (for example, an XScale architecture microprocessor, a Microprocessor without Interlocked Pipeline Stages (MIPS) architecture processor, or another type of processor). A memory 704, such as a Random Access Memory (RAM), a Flash memory, or other type of memory, is typically accessible to the processor. The memory 704 may be adapted to store an operating system (OS) 706, as well as application programs 708, such as a mobile location enabled application that may provide LBSs to a user. The processor 702 may be coupled, either directly or via appropriate intermediary hardware, to a display 710 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, a GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
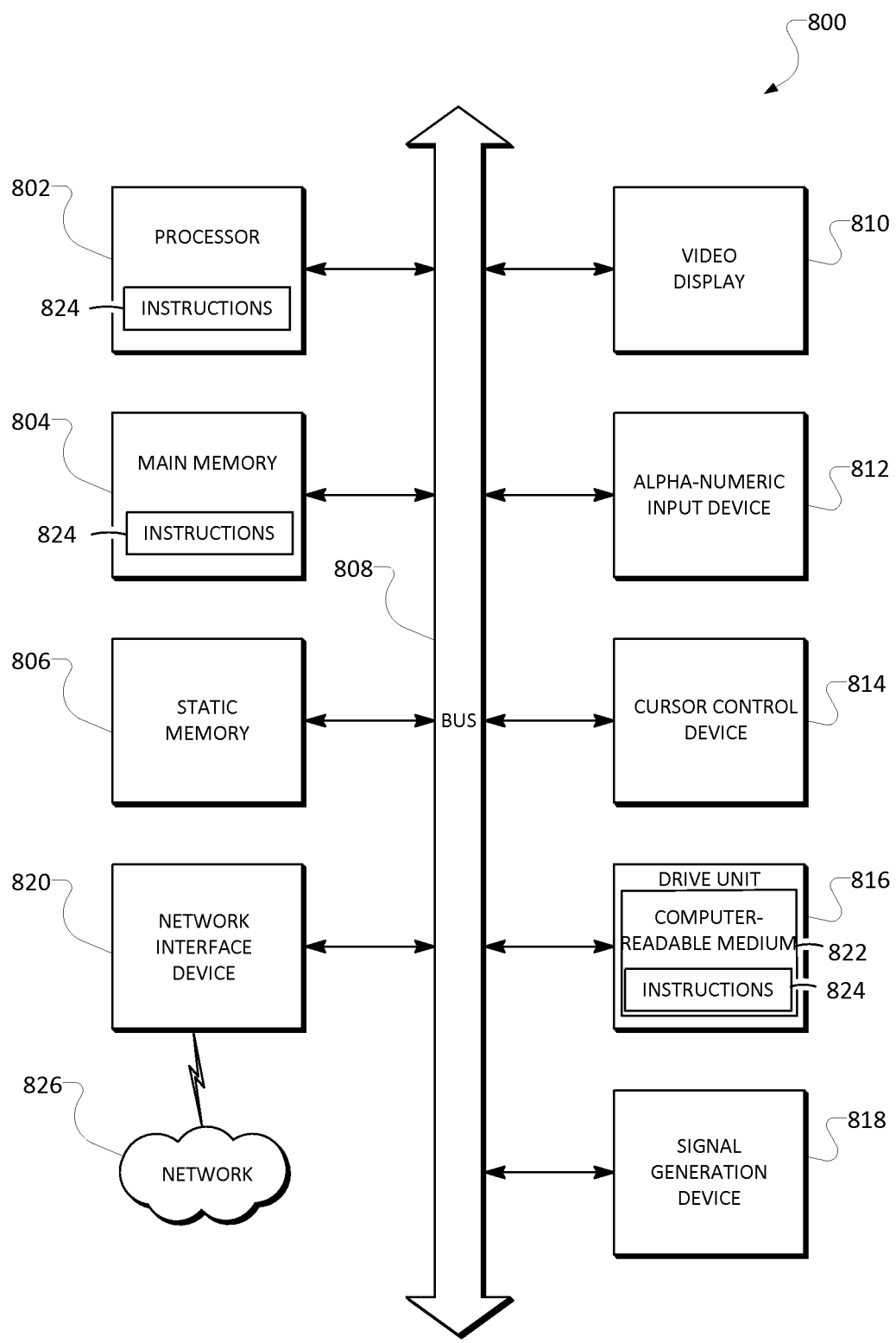
FIG. 8 is a block diagram of a machine in the example form of a computer system within which instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard or a touch-sensitive display screen), a user interface (UI) navigation device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for operating a user device, the method comprising:
    loading an application definition into a client application for execution on the user device;
    loading one or more classes contained in the application definition defined in a central repository database of a server into the client application;
    determining that one or more custom classes not defined in the central repository database are contained in the application definition;
    in response to the determining, validating the one or more custom classes by ensuring that they contain one or more preset functions; and
    loading the one or more custom classes into the client application, thereby overriding or extending at least one of the one or more classes defined in the central repository database; and
    wherein the method is performed subsequent to the user device starting the client application but prior to the client application communicating with the server.

2. The method of claim 1, wherein the one or more custom classes define one or more custom controls for a user interface operating in the client application.

3. The method of claim 1, wherein the one or more classes define a user interface artifact operating in the client application.

4. The method of claim 3, wherein the user interface artifact comprises one or more graphic elements.

5. The method of claim 3, wherein the user interface artifact includes one or more images displayed upon startup of the client application.

6. A user device comprising:
    a processor;
    a memory;
    a client application, stored in the memory, and executable by the processor to perform a method to load an application definition, load one or more classes defined in a central repository database of a server, determine that one or more custom classes not defined in the central repository database are contained in the application definition, in response to the determining, validate the one or more custom classes by ensuring that they contain one or more preset functions, and load the one or more custom classes into the client application, thereby overriding or extending at least one of the one or more classes defined in the central repository database, wherein the method is performed subsequent to the user device starting the client application but prior to the client application communicating with the server.

7. The user device of claim 6, wherein the one or more custom classes define one or more custom controls for a user interface operating in the client application.

8. The user device of claim 6, wherein the one or more classes define a user interface artifact operating in the client application.

9. The user device of claim 8, wherein the user interface artifact comprises one or more graphic elements.

10. The user device of claim 8, wherein the user interface artifact includes one or more images displayed upon startup of the client application.

11. A non-transitory machine-readable storage medium comprising instructions, which when implemented by one or more machines, cause the one or more machines to perform operations comprising:
   loading an application definition into a client application for execution on the user device;
   loading one or more classes contained in the application definition defined in a central repository database of a server into the client application;
   determining that one or more custom classes not defined in the central repository database are contained in the application definition;
   in response to the determining, validating the one or more custom classes by ensuring that they contain one or more preset functions; and
   loading the one or more custom classes into the client application, thereby overriding or extending at least one of the one or more classes defined in the central repository database; and
   wherein the method is performed subsequent to the user device starting the client application but prior to the client application communicating with the server.

12. The non-transitory machine-readable storage medium of claim 11, wherein the one or more custom classes define one or more custom controls for a user interface operating in the client application.

13. The non-transitory machine-readable storage medium of claim 11, wherein the one or more classes define a user interface artifact operating in the client application.

* * * * *